US008541336B2

United States Patent
Shugart et al.

(10) Patent No.: US 8,541,336 B2
(45) Date of Patent: *Sep. 24, 2013

(54) METAL-CARBON COMPOSITIONS
(71) Applicants: Jason V. Shugart, Waverly, OH (US);
Roger C. Scherer, Portsmouth, OH (US)
(72) Inventors: Jason V. Shugart, Waverly, OH (US);
Roger C. Scherer, Portsmouth, OH (US)
(73) Assignee: Third Millennium Metals, LLC, Waverly, OH (US)
( * ) Notice: Subject to any disclaimer, the term of this patent is extended or adjusted under 35 U.S.C. 154(b) by 0 days.

This patent is subject to a terminal disclaimer.

(21) Appl. No.: 13/677,681
(22) Filed: Nov. 15, 2012
(65) Prior Publication Data
US 2013/0084229 A1    Apr. 4, 2013

Related U.S. Application Data

(62) Division of application No. 13/021,271, filed on Feb. 4, 2011, now Pat. No. 8,349,759.
(60) Provisional application No. 61/301,382, filed on Feb. 4, 2010, provisional application No. 61/301,398, filed on Feb. 4, 2010, provisional application No. 61/301,412, filed on Feb. 4, 2010, provisional application No. 61/301,432, filed on Feb. 4, 2010, provisional application No. 61/301,446, filed on Feb. 4, 2010.

(51) Int. Cl.
| | | |
|---|---|---|
| B01J 21/18 | (2006.01) |
| B01J 23/00 | (2006.01) |
| B01J 23/02 | (2006.01) |
| B01J 23/06 | (2006.01) |
| C01B 31/00 | (2006.01) |
| C01B 31/02 | (2006.01) |
| C01B 31/34 | (2006.01) |
| C22C 13/00 | (2006.01) |
| C22C 30/04 | (2006.01) |
| C22C 29/00 | (2006.01) |
| C22C 5/00 | (2006.01) |
| C22B 7/04 | (2006.01) |
| C22B 9/10 | (2006.01) |
| C21B 3/02 | (2006.01) |
| C21B 5/02 | (2006.01) |
| C21B 7/06 | (2006.01) |
| C21C 5/02 | (2006.01) |
| C21C 7/04 | (2006.01) |
| C21C 1/06 | (2006.01) |
| B22F 9/00 | (2006.01) |
| H01B 1/04 | (2006.01) |
| H01B 1/22 | (2006.01) |

(52) U.S. Cl.
USPC ........... 502/184; 502/182; 502/183; 420/557; 420/589; 252/502; 252/503; 423/414; 423/440; 423/445 R; 75/243; 75/45; 75/314

(58) Field of Classification Search
USPC ......... 502/182–184; 420/557, 589; 252/502, 252/503; 423/414, 445 R, 440; 75/243, 75/245, 314
See application file for complete search history.

(56) References Cited

U.S. PATENT DOCUMENTS

| 1,204,927 A | 11/1916 | Antisell |
| 1,775,159 A | 9/1930 | Donaldson et al. |

(Continued)

FOREIGN PATENT DOCUMENTS

| JP | 54047822 | 4/1979 |
| JP | 56-041348 | 4/1981 |

(Continued)

OTHER PUBLICATIONS

"Copper (I) acetylide," Wikipedia (English) (May 16, 2011).

(Continued)

Primary Examiner — Patricia L Hailey
(74) Attorney, Agent, or Firm — Thompson Hine L.L.P.

(57) ABSTRACT

A tin-carbon compound that is a reaction product of tin and carbon, wherein the tin and the carbon form a single phase material that is meltable. The compound is one in which the carbon does not phase separate from the tin when the single phase material is heated to a melting temperature.

20 Claims, 1 Drawing Sheet

(56) References Cited

U.S. PATENT DOCUMENTS

| | | | |
|---|---|---|---|
| 2,060,133 | A | 11/1936 | Summey |
| 2,060,137 | A | 11/1936 | Bahney |
| 2,131,396 | A | 9/1938 | Zublin et al. |
| 2,177,070 | A | 10/1939 | Kikuchi |
| 2,670,284 | A | 2/1954 | Zvanut |
| 3,164,482 | A | 1/1965 | Renkey |
| 3,353,807 | A | 11/1967 | Sixel et al. |
| 3,385,494 | A | 5/1968 | Themelis et al. |
| 3,622,283 | A | 11/1971 | Sara |
| 3,782,924 | A | 1/1974 | Van Houten |
| 3,891,426 | A | 6/1975 | Stawicky et al. |
| 3,896,257 | A | 7/1975 | Kinoshita |
| 3,908,072 | A | 9/1975 | Collin |
| 3,985,545 | A | 10/1976 | Kinoshita |
| 3,993,478 | A | 11/1976 | Hay et al. |
| 4,083,719 | A | 4/1978 | Arakawa et al. |
| 4,171,232 | A | 10/1979 | Finster et al. |
| 4,353,738 | A | 10/1982 | Persson |
| 4,385,930 | A | 5/1983 | Persson |
| 4,726,842 | A | 2/1988 | Reeve et al. |
| 4,767,451 | A | 8/1988 | Bergman et al. |
| 4,808,219 | A | 2/1989 | Metz |
| 4,865,806 | A | 9/1989 | Skibo et al. |
| 4,916,030 | A | 4/1990 | Christodoulou et al. |
| 4,946,647 | A | 8/1990 | Rohatgi et al. |
| 5,200,003 | A | 4/1993 | Rohatgi |
| 5,219,819 | A | 6/1993 | Sharma et al. |
| 5,611,838 | A | 3/1997 | Fritz et al. |
| 5,632,827 | A | 5/1997 | Fujita et al. |
| 5,803,153 | A | 9/1998 | Rohatgi |
| 5,834,115 | A | 11/1998 | Weeks, Jr. et al. |
| 5,900,225 | A | 5/1999 | Mistry et al. |
| 6,036,889 | A | 3/2000 | Kydd |
| 6,063,506 | A | 5/2000 | Andricacos et al. |
| 6,110,817 | A | 8/2000 | Tsai et al. |
| 6,150,262 | A | 11/2000 | Go et al. |
| 6,228,904 | B1 | 5/2001 | Yadav et al. |
| 6,231,634 | B1 | 5/2001 | Shaw |
| 6,238,454 | B1 | 5/2001 | Polese et al. |
| 6,287,364 | B1 | 9/2001 | Mizuta et al. |
| 6,372,010 | B1 | 4/2002 | Shver et al. |
| 6,465,390 | B1 | 10/2002 | Hakata et al. |
| 6,596,131 | B1 | 7/2003 | Scott et al. |
| 6,624,108 | B1 | 9/2003 | Clark et al. |
| 6,649,265 | B1 | 11/2003 | Kawamura et al. |
| 6,765,949 | B2 | 7/2004 | Chang |
| 6,799,089 | B2 | 9/2004 | Toulhoat |
| 6,986,873 | B2 * | 1/2006 | Sundberg et al. ............ 423/324 |
| 7,169,328 | B2 | 1/2007 | Miller et al. |
| 7,311,135 | B1 | 12/2007 | Suganuma et al. |
| 7,399,703 | B2 | 7/2008 | Kawakami |
| 7,468,088 | B1 | 12/2008 | Blankenhorn et al. |
| 7,767,113 | B2 | 8/2010 | Kobayashi |
| 8,349,759 | B2 * | 1/2013 | Shugart et al. ................ 502/184 |
| 2002/0056915 | A1 | 5/2002 | Go |
| 2004/0265615 | A1 | 12/2004 | Kodas et al. |
| 2005/0061107 | A1 | 3/2005 | Hampden-Smith et al. |
| 2006/0194097 | A1 | 8/2006 | Kim et al. |
| 2007/0190348 | A1 * | 8/2007 | Ichiki ............................ 428/567 |
| 2008/0050589 | A1 | 2/2008 | Tsushima et al. |
| 2008/0093577 | A1 | 4/2008 | Khraishi et al. |
| 2009/0176090 | A1 | 7/2009 | So et al. |
| 2009/0180919 | A1 | 7/2009 | Blankenhorn et al. |
| 2010/0035775 | A1 | 2/2010 | Viswanathan |
| 2010/0327233 | A1 | 12/2010 | Shugart |

FOREIGN PATENT DOCUMENTS

| | | |
|---|---|---|
| JP | 58177422 | 10/1983 |
| JP | 04-124235 | 4/1992 |
| JP | 07-254404 | 10/1995 |
| JP | 08-020829 | 1/1996 |
| JP | 11-092837 | 4/1999 |
| JP | 11-100625 | 4/1999 |
| JP | 3040768 | 5/2000 |
| JP | 2008-057034 | 3/2008 |

OTHER PUBLICATIONS

"Tight-Binding Parameters for Copper," http:/cst-lwww.nrl.navy.mil/bind/cu.html (Nov. 3, 1999).

Andreeva, V.D. et al., "The Effect of Copper Atoms on the Graphite Structure," *Technical Physics Letters*, vol. 28, No. 9, pp. 759-761 (2002).

Barcena, J. et al., "Novel Copper/Carbon Nanofibres Composites for High Thermal Conductivity Electronic Packaging."

Bensebaa, F. et al., "Raman characterization of metal-alkanethiolates," *Spectrochimica Acta Part A*, 55, pp. 1229-1236 (1999).

Boehm, H.-P. et al., "Nomenclature and Terminology of Graphite Intercalation Compounds," *Pure & Appl. Chem.*, vol. 66, No. 9, pp. 1893-1901 (1994).

Brady, J.E., *General Chemistry: Principles and Structures*, 5th Edition, John Wiley & Sons, Inc., Chapter 12, pp. 366-369 (1990).

CAS Reg. No. 227310-68-1 (Jul. 1999).

Castro Neto, A.H., "Pauling's dreams for graphene," *Physics*, 2, 30 (2009) DOI: 10.1103/Physics.2.30 (Apr. 20, 2009).

Charinpanitkul, T. et al., "Single-step synthesis of nanocomposite of copper and carbon nanoparticles using arc discharge in liquid nitrogen," (Abstract), ScienceDirect—Materials Chemistry and Physics, http://www.sciencedirect.com/science?_ob=ArticleURL&_udi=B6T . . . , available online Mar. 27, 2009.

Chuprasov, V.V. et al., "Obtaining Carbon Nanoparticles with the Use of Electric-Arc Discharge between Coaxial Electrodes," (Abstract), *Journal of Engineering Physics and Thermophysics*, vol. 77, No. 3 (May 2004).

Dumé, B., "Carbon nanotubes produce smooth nanoribbons," http://nanotechweb.org/cws/article/tech/38729 (Apr. 17, 2009).

Floriani, C., "Metal-Carbon and Carbon-Carbon Bond Formation From Small Molecules and One Carbon Functional Groups," *Pure & Appl. Chem*, vol. 54, No. 1, pp. 59-64 (1982).

*Fundamentals of Modern Manufacturing Materials, Processes, and Systems*, published by John Wiley & Sons, Inc., p. 148 (2010).

Hirschler, B., "Scientists make super-strong metallic spider silk," YAHOO! News, http://news.yahoo.com/s/nm/20090423/sc_nm/us_spider_silk (Apr. 23, 2009).

Ionescu, V. et al., "Carbon-copper amorphous composite coatings grown by thermionic vacuum arc method," *Ovidius University Annals of Chemistry*, vol. 20, No. 2, pp. 193-198 (2009).

Luo, J. et al., "Phase Properties of Carbon-Supported Gold-Platinum Nanoparticles with Different Bimetallic Compositions," *Chem. Mater.*, vol. 17, No. 12, pp. 3086-3091 (2005).

PCT, International Search Report and Written Opinion, International Application No. PCT/US2011/023688 (Apr. 7, 2011).

Rehani, Bharati et al., "Fabrication of Silver-Graphite Contact Materials Using Silver Nanopowders," *Journal of Materials Engineering Performance*, vol. 19(1), pp. 64-69 (Feb. 2010).

Villalobos, J.M. et al., "A New Paradigm for Carbon-Carbon Bond Formation: Aerobic, Copper-Templated Cross-Coupling," *J. Am. Chem. Soc.* (Nov. 30, 2007).

* cited by examiner

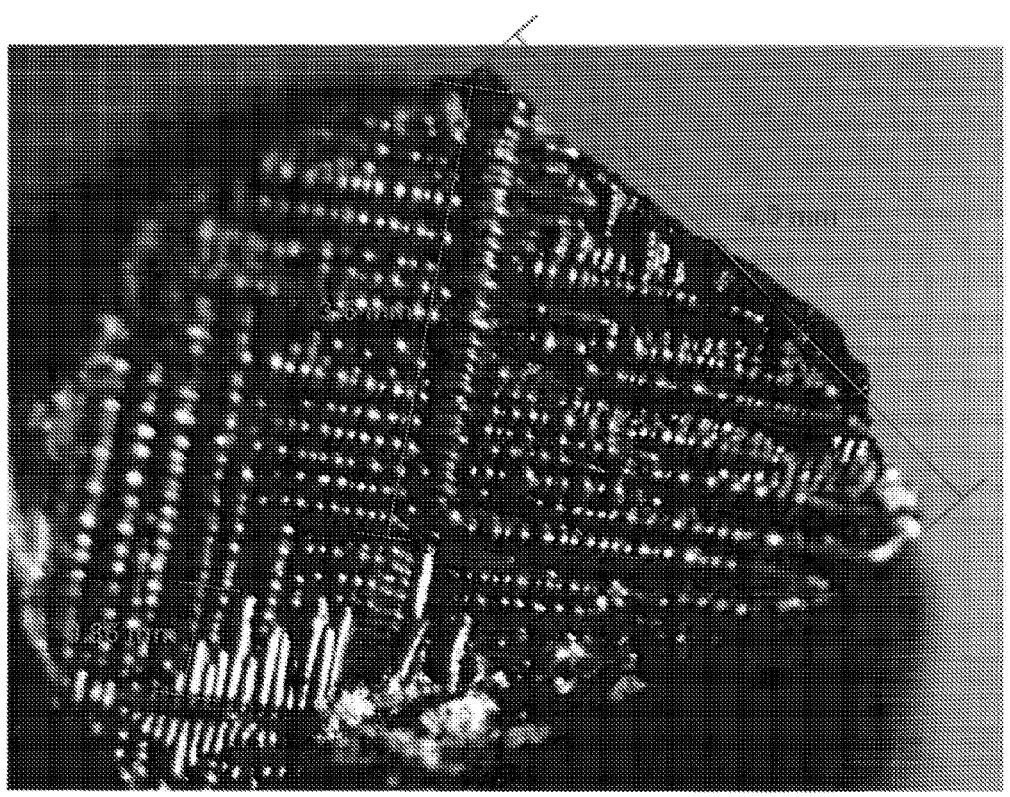

METAL-CARBON COMPOSITIONS

RELATED REFERENCES

This application is a divisional of U.S. application Ser. No. 13/021,271, filed Feb. 4, 2011, which claims the benefit of U.S. provisional application No. 61/301,382, filed Feb. 4, 2010, U.S. provisional application No. 61/301,398, filed Feb. 4, 2010, U.S. provisional application No. 61/301,412, filed Feb. 4, 2010, U.S. provisional application 61/301,432, filed Feb. 4, 2010, and U.S. provisional application No. 61/301,446, filed Feb. 4, 2010.

FIELD

The present application relates to compounds and/or compositions that include a metal and carbon that are formed into a single phase material and, more particularly, to gold-carbon, silver-carbon, tin-carbon, zinc-carbon, and lead-carbon compositions wherein the carbon does not phase separate from the metal when the metal-carbon compositions are melted or re-melted.

BACKGROUND

Gold is highly resistant to oxidation in air and water, and is relatively resistant to corrosive agents. Gold alloys, such as gold alloys of silver and copper, also present desired properties. Nonetheless, those skilled in the art continue to seek to improve upon the properties of gold.

Silver is high prized for its aesthetic, chemical and physical properties. For example, silver is highly electrically and thermally conductive. However, silver's high cost and propensity to tarnish when exposed to atmospheric conditions has limited its use in industrial applications. Therefore, those skilled in the art continue to attempt to enhance the physical and chemical properties of silver.

Tin is a malleable, corrosion-resistant metal that is useful in a wide variety of applications. Nonetheless, those skilled in the art continue to attempt to enhance the physical and chemical properties of tin.

Zinc is a brittle and reactive metal that is used in a wide variety of applications. Nonetheless, those skilled in the art continue to attempt to enhance the physical and chemical properties of zinc.

Lead is a malleable and corrosion-resistant reactive metal that is used in a wide variety of applications. Nonetheless, those skilled in the art continue to attempt to enhance the physical and chemical properties of lead.

SUMMARY

In one aspect, the disclosed metal-carbon composition may include gold and carbon, silver and carbon, lead and carbon, zinc and carbon, or tin and carbon, wherein the metal and the carbon form a single phase material and the carbon does not phase separate from the metal when the material is heated to a melting temperature.

In another aspect, the disclosed metal-carbon composition may consist essentially of the metal and the carbon. The metal and the carbon form a single phase material, where the carbon does not phase separate from the metal when the material is heated to a melting temperature. The metal-carbon composition may be a gold and carbon, silver and carbon, lead and carbon, zinc and carbon, or tin and carbon. Herein, the metal in the metal-carbon composition is tin.

In another aspect, tin-carbon compounds are disclosed that are a reaction product of tin and carbon that is a single phase material. The single phase material is meltable, and the carbon does not phase separate from the tin when the single phase material is subsequently re-melted.

Other aspects of the disclosed tin-carbon composition will become apparent from the following description and the appended claims.

BRIEF DESCRIPTION OF THE DRAWINGS

FIG. 1 is an image of a fracture surface of the silver-carbon composition formed according to Example Ag-3 that has been fractured by bending.

DETAILED DESCRIPTION

Metal-based compounds and/or compositions that have carbon incorporated therein are disclosed. The compounds or compositions are a metal-carbon material that form a single phase material, and in such a way that the carbon does not phase separate from the metal when the material is melted. The metal may be gold, silver, tin, lead, or zinc. Carbon can be incorporated into any of these metals by melting the metal, mixing the carbon into the molten metal and, while mixing, applying a current of sufficient amperage to the molten mixture such that the carbon becomes incorporated into the metal, thereby forming a single phase metal-carbon material. It is important that the current is applied while mixing the carbon into the molten metal. The current is preferably DC current, but is not necessarily limited thereto. The current may be applied intermittently in periodic or non-periodic increments. For example, the current may optionally be applied as one pulse per second, one pulse per two seconds, one pulse per three seconds, one pulse per four seconds, one pulse per five seconds, one pulse per six seconds, one pulse per seven seconds, one pulse per eight seconds, one pulse per nine seconds, one pulse per ten seconds and combinations or varying sequences thereof. Intermittent application of the current may be advantageous to preserve the life of the equipment and it can save on energy consumption costs.

The current may be provided using an arc welder. The arc welder should include an electrode that will not melt in the metal, such as a carbon electrode. In carrying out the method, it may be appropriate to electrically couple the container housing the molten metal to ground before applying the current. Alternately, the positive and negative electrode can be placed generally within about 2 to 7 inches of one another, which increases the current density and as a result increases the bonding rate of the metal and carbon.

As used herein, the term "phase" means a distinct state of matter that is identical in chemical composition and physical state and is discernable by the naked eye or using basic microscopes (e.g., at most about 10,000 times magnification). Therefore, a material appearing as a single phase to the naked eye, but showing two distinct phases when viewed on the nano-scale should not be construed as having two phases.

As used herein, the phrase "single phase" means that the elements making up the material are bonded together such that the material is in one distinct phase.

While the exact chemical structure of the disclosed metal-carbon material is currently not known, without being limited to any particular theory, it is currently believed that the steps of mixing and applying electrical energy result in the formation of chemical bonds between the metal and carbon atoms, thereby rendering the disclosed metal-carbon compositions unique vis-à-vis known metal-carbon composites and solutions of metal and carbon. Without being bound by theory, it is believed that the carbon is covalently bonded to the metal in the metal-carbon materials disclosed herein. The bonds may be single, double, and triple covalent bonds or combinations thereof, but it is believed, again without being bound by theory, that the bonds are most likely double or triple bonds. Accordingly, the covalent bonds formed between the metal and the carbon are not broken, i.e., the carbon does not separate from the metal, merely by melting the resulting single phase metal-carbon material or "re-melting" as described above. Furthermore, without being limited to any particular theory, it is believed that the disclosed metal-carbon material is a nanocomposite material and, as evidenced by the Examples herein, the amount of electrical energy (e.g., the current) applied to form the disclosed metal-carbon composition initiates an endothermic chemical reaction.

The disclosed metal-carbon material does not phase separate, after formation, when re-melted by heating the material to a melting temperature (i.e., a temperature at or above a temperature at which the resulting metal-carbon material begins to melt or becomes non-solid). Thus, the metal-carbon material is a single phase composition. For each of the five metal-carbon materials disclosed herein stable compositions of matter were made that do not phase separate upon subsequent re-melting. Furthermore, the metal-carbon material remains intact as a vapor, as the same chemical composition, as evidenced by magnetron sputtering tests. Samples of the various metal-carbon materials were sputtered and upon sputtering were deposited as a thin film on a substrate and retained the electrical resistivity of the bulk material being sputtered. If the metal and carbon were not bonded together, then it would have been expected from electrical engineering principles and physics that the electrical resistivity would be roughly two orders of magnitude higher. This did not occur.

The carbon in the disclosed metal-carbon compound may be obtained from any carbonaceous material capable of producing the disclosed metal-carbon composition. Non-limiting examples include high surface area carbons, such as activated carbons, and functionalized or compatibilized carbons (as familiar to the metal and plastics industries). A suitable non-limiting example of an activated carbon is a powdered activated carbon available under the trade name WPH®-M available from Calgon Carbon Corporation of Pittsburgh, Pa. Functionalized carbons may be those that include another metal or substance to increase the solubility or other property of the carbon relative to the metal the carbon is to be reacted with, as disclosed herein. In one aspect, the carbon may be functionalized with nickel, copper, aluminum, iron, or silicon using known techniques.

In one embodiment, the metal in the metal-carbon compound is gold. The gold may be any gold or gold alloy capable of producing the disclosed gold-carbon compound. Those skilled in the art will appreciate that the selection of gold may be dictated by the intended application of the resulting gold-carbon compound. In one embodiment, the gold is 0.9999 gold.

In another embodiment, the metal in the metal-carbon compound is silver. The silver may be any silver or silver alloy capable of producing the disclosed silver-carbon compound. Those skilled in the art will appreciate that the selection of silver may be dictated by the intended application of the resulting silver-carbon compound. In one embodiment, the silver is 0.9995 silver. In one embodiment, the silver is sterling silver.

In another embodiment, the metal in the metal-carbon compound is tin. The tin may be any tin or tin alloy capable of producing the disclosed tin-carbon compound. Those skilled in the art will appreciate that the selection of tin may be dictated by the intended application of the resulting tin-carbon compound. In one embodiment, the tin is 0.999 tin. In one embodiment, the tin is an alloy such as a bronze, a tin solder, or a tin pewter.

In another embodiment, the metal in the metal-carbon compound is lead. The lead may be any lead or lead alloy capable of producing the disclosed lead-carbon compound. Those skilled in the art will appreciate that the selection of lead may be dictated by the intended application of the resulting lead-carbon compound. In one embodiment, the lead is 0.999 lead. In one embodiment, the lead is an alloy such as a tin solder or a tin pewter, which both contain lead.

In another embodiment, the metal in the metal-carbon compound is zinc. The zinc may be any zinc or zinc alloy capable of producing the disclosed zinc-carbon compound. Those skilled in the art will appreciate that the selection of zinc may be dictated by the intended application of the resulting zinc-carbon compound. In one embodiment, the zinc is 0.999 zinc. In one embodiment, the zinc is an alloy such as a brass.

In another aspect, the single phase metal-carbon material may be included in a composition or may be considered a composition because of the presence of other impurities or other alloying elements present in the metal and/or metal alloy.

Similar to metal matrix composites, which include material at least two constituent parts, one being a metal, the metal-carbon compositions disclosed herein may be used to form metal-carbon matrix composites. The other material included in the metal-carbon matrix composite may be a different metal or another material, such as but not limited to a ceramic, glass, carbon flake, fiber, mat, or other form. The metal-carbon matrix composites may be manufactured or formed using known and similarly adapted techniques to those for metal matrix composites.

In one aspect, the disclosed metal-carbon compound or composition may comprise at least about 0.01 percent by weight carbon. In another aspect, the disclosed metal-carbon compound or composition may comprise at least about 0.1 percent by weight carbon. In another aspect, the disclosed metal-carbon compound composition may comprise at least about 1 percent by weight carbon. In another aspect, the disclosed metal-carbon compound or composition may comprise at least about 5 percent by weight carbon. In another aspect, the disclosed metal-carbon compound or composition may comprise at least about 10 percent by weight carbon. In yet another aspect, the disclosed metal-carbon compound or composition may comprise at least about 20 percent by weight carbon.

In another aspect, the disclosed metal-carbon compound or composition may comprise a maximum of 1%, 5%, 10%, 15%, 20%, 25%, 30%, 35%, or 40% by weight carbon. In one embodiment, the metal-carbon compound or composition may have the maximum percent by weight carbon customized to provide particular properties thereto.

The percent by weight carbon present in the compound or composition may change the thermal conductivity, ductility, electrical conductivity, corrosion resistance, oxidation, formability, strength performance, and/or other physical or chemical properties. In the silver-carbon compound or composition it has been determined that increased carbon content enhances the ductility of the material. However, surprisingly, the zinc-carbon compound or composition has decreased ductility with increased carbon content. Accordingly, the customization of the physical and chemical properties of the metal-carbon compounds or compositions is not uniform across the metals selected and requires careful research and analysis.

The formation of the metal-carbon composition may result in a material having at least one significantly different property than the metal. For example, the silver-carbon compositions and the copper-carbon compositions may not have the antimicrobial property of silver and copper, and the lead-carbon compositions may not have the toxicity of lead.

In one embodiment, the carbon is present in the metal-carbon material as about 0.01 to about 40 percent by weight of the composition. In another embodiment, the carbon is present in the metal-carbon material as about 1 to about 70 percent by weight of the composition.

Accordingly, the disclosed metal-carbon compositions may be formed by combining certain carbonaceous materials with the selected metal to form a single phase material, wherein the carbon from the carbonaceous material does not phase separate from the metal when the single phase material is cooled and subsequently re-melted. The metal-carbon compositions may be used in numerous applications as a replacement for more traditional metals or metal alloys and/or plastics and in hereinafter developed technologies and applications.

EXAMPLES

Gold

Example Au-1

A graphite crucible (electrically coupled to ground) having a volume of 65 $in^3$ was positioned in a Kerr brand electric induction furnace. The crucible was charged with 151 grams of 99.99 percent plus purity gold. The gold was heated to a temperature of 2000° F.

The agitator end of a rotary mixer was inserted into the molten gold and the rotary mixer was actuated to form a vortex. While mixing, 7.5 grams of powdered activated carbon was introduced to the molten gold using a custom built feeding unit. The powdered activated carbon used was WPH®-M powdered activated carbon, available from Calgon Carbon Corporation of Pittsburgh, Pa.

A carbon electrode affixed to an arc welder was positioned in the crucible. The arc welder was a Pro-Mig 135 arc welder obtained from The Lincoln Electric Company of Cleveland, Ohio. Immediately after adding the powdered activated carbon to the molten gold, and while continuing to mix the carbon into the molten gold, the arc welder was actuated (setting: D) to supply electric current through the molten gold and carbon mixture. A graphite electrode was attached to the welding rod to supply the current to the melt, which was applied intermittently as appropriate for the arc welder and the electrical power circuit. The temperature of the material rapidly dipped to 1700° F. and the material solidified, suggesting an endothermic reaction had occurred.

Subsequently, the material was reheated to 2048° F. and an additional 7.5 grams of powdered activated carbon was added and the electric current was applied, resulting in a temperature drop to 1948° F. The material was reheated to 2048° F. and an additional 7.5 grams of powdered activated carbon was added and the electric current was applied, resulting in a temperature drop to 1957° F. The material was reheated to 2048° F. and an additional 7.5 grams of powdered activated carbon was added and the electric current was applied, resulting in a temperature drop to 1981° F. The material was reheated to 2048° F. and an additional 7.5 grams of powdered activated carbon was added and the electric current was applied, resulting in a temperature drop to 1970° F.

After cooling, the gold-carbon composition was observed by the naked eye to exist in a single phase. The material was noted to have cooled rapidly. The cooled gold-carbon composition was then re-melted by heating to 2048° F., and no phase separation was observed.

Furthermore, testing showed that the gold-carbon composition had improved thermal conductivity and fracture toughness when rolled into a thin film.

Silver

Example Ag-1

A graphite crucible (electrically coupled to ground) having a volume of 65 $in^3$ was positioned in a Kerr brand electric induction furnace. The crucible was charged with 15 grams of 99.99 percent plus purity silver. The silver was heated to a temperature of 1860° F.

The agitator end of a rotary mixer was inserted into the molten silver and the rotary mixer was actuated to form a vortex. While mixing, 30 grams of powdered activated carbon (no clumps) was introduced to the molten silver using a custom built feeding unit. The powdered activated carbon used was WPH®-M powdered activated carbon, available from Calgon Carbon Corporation of Pittsburgh, Pa.

A carbon electrode affixed to an arc welder was positioned in the crucible. The arc welder was a Pro-Mig 135 arc welder obtained from The Lincoln Electric Company of Cleveland, Ohio. Immediately after adding the powdered activated carbon to the molten silver, and while continuing to mix the carbon into the molten silver, the arc welder was actuated (setting: A-1) to supply electric current through the molten silver and carbon mixture. A graphite electrode was attached to the welding rod to supply the current to the melt, which was applied intermittently as appropriate for the arc welder and the electrical power circuit. Then, the molten material was poured into a holding vessel to cool.

After cooling, the silver-carbon composition was observed by the naked eye to exist in a single phase. The material was noted to have cooled rapidly. The cooled silver-carbon composition was then re-melted in the crucible by heating to 2048° F., and no phase separation was observed.

Furthermore, testing showed that the silver-carbon composition was resistant to tarnishing, even in the presence of hydrogen sulfide, and had improved thermal conductivity and fracture toughness when rolled into a thin film. Grain orientation and significantly reduced grain size were also observed.

Example Ag-2

Using the same experimental set-up described in Example Ag-1, 137 grams of 99.99 percent plus purity silver was heated to a temperature of 2000° F. and 7.5 grams of powdered activated carbon was added. After applying the electric current, the temperature of the material rapidly dipped to 1670° F., suggesting an endothermic reaction had occurred. The material was reheated to 2000° F. and additional powdered activated carbon (7.5 grams) was added and, while mixing, the material was once again pulsed with electric current.

After cooling, the silver-carbon composition weighed 151 grams and was observed by the naked eye to exist in a single phase. The material was noted to have cooled rapidly. The cooled silver-carbon composition was then re-melted by heating to 2048° F., and no phase separation was observed.

Furthermore, a bar formed from the resulting silver-carbon composition was surprisingly resistant to fracturing after repeated bending, indicating significantly enhanced fracture toughness.

Example Ag-3

Using the same experimental set-up described in Example Ag-1, 1100 grams of 99.99 percent plus purity silver was heated to a temperature of 1880° F. and an unknown quantity of powdered activated carbon was added and an electric current was applied to the mixture. The temperature of the material was observed to rapidly dip to 1700° F. The material was reheated to 1920° F. and a second unknown quantity of powdered activated carbon was added and the material was once again pulsed with electric current.

The resulting material was poured in a mold and left in a kiln overnight. The following day, the cooled silver-carbon composition was removed from the mold and bent until fractured. The fractured structure, as shown in FIG. 1, has an unusual amount of orientation.

Tin

Example Sn-1

A graphite crucible (electrically coupled to ground) having a volume of 65 in$^3$ was positioned in a Kerr brand electric induction furnace. The crucible was charged with 90 grams of 99.9 percent pure tin. The tin was heated to a temperature of 550° F.

The agitator end of a rotary mixer was inserted into the molten tin and the rotary mixer was actuated to form a vortex. While mixing, an unmeasured quantity of powdered activated carbon was introduced to the molten tin using a custom built feeding unit. The powdered activated carbon used was WPH®-M powdered activated carbon, available from Calgon Carbon Corporation of Pittsburgh, Pa.

A carbon electrode affixed to an arc welder was positioned in the crucible. The arc welder was a Pro-Mig 135 arc welder obtained from The Lincoln Electric Company of Cleveland, Ohio. Immediately after adding the powdered activated carbon to the molten tin, and while continuing to mix the carbon into the molten tin, the arc welder was actuated (setting: A-1) to supply electric current through the molten tin and carbon mixture. A graphite electrode was attached to the welding rod to supply the current to the melt, which was applied intermittently as appropriate for the arc welder and the electrical power circuit. A slight temperature increase was observed and the tin-carbon composition appeared as a viscous gel.

After cooling, the tin-carbon composition was observed by the naked eye to exist in a single phase. The material was noted to have cooled rapidly. The cooled tin-carbon composition was then re-melted by heating to 1000° F., and no phase separation was observed.

Furthermore, the tin-carbon composition appeared to be more putty-like than tin metal while below the melting temperature. The resulting tin-carbon material underwent a color change from gray to a gold-tinted color. Testing showed that the tin-carbon composition had a reduced grain size, increased thermal conductivity and improved fracture toughness.

Example Sn-2

Using the same experimental set-up described in Example Sn-1, 238 grams of 99.9 percent pure tin was heated to a temperature of 604° F. and an unmeasured quantity of powdered activated carbon was added. After applying the electric current (setting: D), the material gelled and the temperature of the material slightly increased. The material was heated to 700° F. and additional powdered activated carbon was added and, while mixing, was once again pulsed with electric current. Finally, the material was heated to 800° F. and additional powdered activated carbon was added and the mixture was once again pulsed with electric current.

After cooling, the tin-carbon composition was evaluated and had the same properties described above in Example Sn-1. The material was noted to have cooled rapidly.

Zinc

Example Zn-1

A graphite crucible (electrically coupled to ground) having a volume of 65 in$^3$ was positioned in a Kerr brand electric induction furnace. The crucible was charged with 213 grams of 99.9 percent pure zinc. The zinc was heated to a temperature of 893° F.

The agitator end of a rotary mixer was inserted into the molten zinc and the rotary mixer was actuated to form a vortex. While mixing, an unmeasured quantity of powdered activated carbon was introduced to the molten zinc using a custom built feeding unit. The powdered activated carbon used was WPH®-M powdered activated carbon, available from Calgon Carbon Corporation of Pittsburgh, Pa.

A carbon electrode affixed to an arc welder was positioned in the crucible. The arc welder was a Pro-Mig 135 arc welder obtained from The Lincoln Electric Company of Cleveland, Ohio. Immediately after adding the powdered activated carbon to the molten zinc, and while continuing to mix the carbon into the molten zinc, the arc welder was actuated (setting: D) to supply electric current through the molten zinc and carbon mixture. A graphite electrode was attached to the welding rod to supply the current to the melt, which was applied intermittently as appropriate for the arc welder and the electrical power circuit. The temperature of the material increased to 917° F. and the material appeared as a viscous gel. The dross was removed and the material was allowed to slightly cool before reheating the material to 888° F., at which point the material remained gel-like despite being at a temperature 100° F. greater than the melting temperature of zinc.

After cooling, the zinc-carbon composition was observed by the naked eye to exist in a single phase. The material was noted to have cooled rapidly. The cooled zinc-carbon composition was then re-melted by heating to greater than 1000° F., and no phase separation was observed.

Testing showed that the zinc-carbon composition had a significantly reduced grain size, increased thermal conductivity and increased reflectivity. No enhancement in ductility or fracture toughness was observed.

Example Zn-2

Using the same experimental set-up described in Example Zn-1, 622 grams of 99.9 percent pure zinc was heated to a temperature of 900° F. and an unmeasured quantity of powdered activated carbon was added to the molten zinc. After applying the electric current (setting: D), the material gelled and the temperature of the material remained at about 900° F. The material remained gel-like after being heated to 987° F., but turned a very shinny, yellowish-orange color after being heated to 1087° F. With the material at 1087° F., additional powdered activated carbon was added and, while mixing, was once again pulsed with electric current, after which the material was allowed to cool. The material was noted to have cooled rapidly.

The resulting zinc-carbon composition was evaluated and had the same properties described above in Example Zn-1.

Lead

Example Pb-1

A graphite crucible (electrically coupled to ground) having a volume of 65 in$^3$ was positioned in a Kerr brand electric induction furnace. The crucible was charged with 201 grams of 99.9 percent pure lead. The lead was heated to a temperature of 721° F.

The agitator end of a rotary mixer was inserted into the molten lead and the rotary mixer was actuated to form a vortex. While mixing, an unmeasured quantity of powdered activated carbon was introduced to the molten lead using a custom built feeding unit. The powdered activated carbon used was WPH®-M powdered activated carbon, available from Calgon Carbon Corporation of Pittsburgh, Pa.

A carbon electrode affixed to an arc welder was positioned in the crucible. The arc welder was a Pro-Mig 135 arc welder obtained from The Lincoln Electric Company of Cleveland, Ohio. Immediately after adding the powdered activated carbon to the molten lead, and while continuing to mix the carbon into the molten lead, the arc welder was actuated to supply electric current through the molten lead and carbon mixture. A graphite electrode was attached to the welding rod to supply the current to the melt, which was applied intermittently as appropriate for the arc welder and the electrical power circuit. The temperature of the material increased to 821° F. The material was cooled to 784° F. and poured into molds, after which the material rapidly cooled to room temperature. The material did not pour like ordinary molten lead and exhibited unusual layering in the mold, resembling a thermoplastic. It was also noted that the material cooled rapidly.

The lead-carbon composition was observed by the naked eye to exist in a single phase. The cooled lead-carbon composition was then re-melted by heating to greater than 1000° F., and no phase separation was observed.

Although various aspects of the disclosed metal-carbon compositions have been described, modifications may occur to those skilled in the art upon reading the specification. The present application includes such modifications and is limited only by the scope of the claims.

What is claimed is:

1. A metal-carbon composition comprising:
   tin and carbon, wherein the tin and the carbon form a single phase material formed by mixing carbon into the tin while molten under conditions that chemically react the tin and the carbon, and wherein the single phase material is meltable and the carbon does not phase separate from the tin when the single phase material is subsequently re-melted.

2. The metal-carbon composition of claim 1 wherein the tin is from a tin alloy, the tin is bonded to the carbon and the composition includes the remaining alloying elements or impurities of the tin alloy.

3. The metal-carbon composition of claim 1 wherein the carbon comprises about 0.01 to about 40 percent by weight of the material.

4. The metal-carbon composition of claim 1 wherein the carbon comprises at least about 1 percent by weight of the material.

5. The metal-carbon composition of claim 1 wherein the carbon comprises at least about 5 percent by weight of the material.

6. The metal-carbon composition of claim 1 wherein the carbon comprises at most about 10 percent by weight of the material.

7. The metal-carbon composition of claim 1 wherein the carbon comprises at most about 25 percent by weight of the material.

8. The metal-carbon composition of claim 1 further comprising an additive that imparts a change to a physical or mechanical property of the composition.

9. The metal-carbon composition of claim 1 wherein the carbon is a high surface area carbon.

10. The metal-carbon composition of claim 9 wherein the high surface area carbon is a powdered carbon.

11. A metal-carbon composition consisting essentially of tin and carbon, wherein the tin and the carbon form a single phase material formed by mixing carbon into the tin while molten under conditions that chemically react the tin and the carbon, and wherein the single phase material is meltable and the carbon does not phase separate from the tin when the single phase material is subsequently re-melted.

12. The metal-carbon composition of claim 11 wherein the tin is from a tin alloy, the tin is bonded to the carbon and the composition includes the remaining alloying elements or impurities of the tin alloy.

13. The metal-carbon composition of claim 11 wherein the carbon comprises about 0.01 to about 40 percent by weight of the material.

14. The metal-carbon composition of claim 11 wherein the carbon comprises at least about 1 percent by weight of the material.

15. The metal-carbon composition of claim 11 wherein the carbon comprises at least about 5 percent by weight of the material.

16. The metal-carbon composition of claim 11 wherein the carbon comprises at most about 10 percent by weight of the material.

17. The metal-carbon composition of claim 11 wherein the carbon comprises at most about 25 percent by weight of the material.

18. The metal-carbon composition of claim 11 wherein the carbon is a high surface area carbon.

19. The metal-carbon composition of claim 18 wherein the high surface area carbon is a powdered carbon.

20. A tin-carbon compound comprising:
   a reaction product of tin and carbon that is a single phase material, wherein the single phase material is meltable, and the carbon does not phase separate from the tin when the single phase material is subsequently re-melted.

* * * * *